J. RYAN.
LIQUID LEVEL INDICATOR.
APPLICATION FILED MAY 14, 1919.
1,313,738.
Patented Aug. 19, 1919.
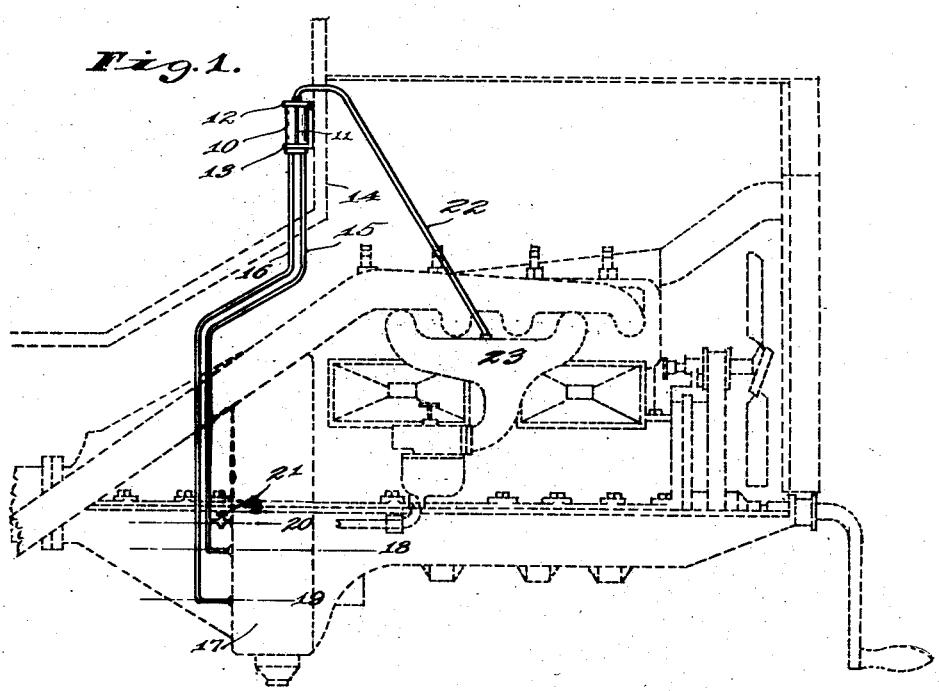
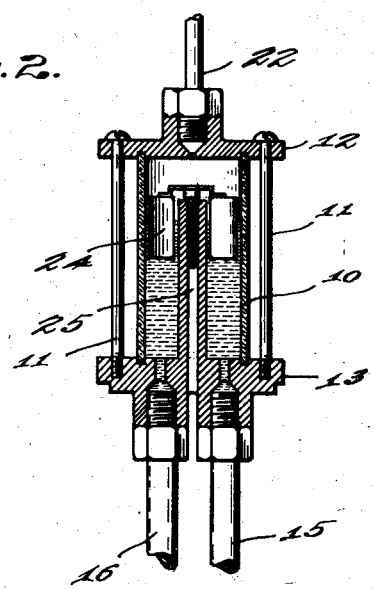

UNITED STATES PATENT OFFICE.

JAMES RYAN, OF INDIANAPOLIS, INDIANA.

LIQUID-LEVEL INDICATOR.

1,313,738.      Specification of Letters Patent.      Patented Aug. 19, 1919.

Application filed May 14, 1919. Serial No. 297,078.

*To all whom it may concern:*

Be it known that I, JAMES RYAN, a citizen of the United States residing at Indianapolis, in the county of Marion and State of Indiana, have invented a new and useful Liquid-Level Indicator, of which the following is a specification.

It is the object of my invention to provide a simply operated and conveniently located liquid-level indicator for automobiles, for constantly indicating at the dash while the engine is in operation the level of the liquid in an associated liquid container, such as oil in the crank-case; and particularly to do this by power obtained from the vacuum of the engine intake.

In some automobiles there is an oil-level indicator at the engine itself, under the hood, requiring the hood to be raised in order to ascertain the oil level. In others the indication is obtained merely by two pet-cocks communicating with the crank-case at high and low levels, so that by opening these pet-cocks the discharge of oil obtained or not obtained will indicate whether the oil level in the crank-case is above or below the levels of these two pet-cocks. Both of these arrangements are unsatisfactory in that because they require effort to inspect they are frequently neglected, with the consequent possibility of damage to the engine by reason of lack of oil.

According to my present invention, there is a constant indication directly before the eyes of the driver of the oil level in the crank-case, so that it is unnecessary for him to make any special effort to ascertain such oil level, and he is instantly made aware of the fact in case the oil level falls too low.

The accompanying drawing illustrates my invention. Figure 1 is an elevation of an automobile engine and part of the associated automobile, showing my liquid-level indicator in position on the dash and connected to the engine to indicate the oil level in the engine crank-case; and Fig. 2 is a vertical central section through the liquid-level indicator on the dash.

According to the present invention, as applied to indicate the oil level in an engine crank-case, a transparent vessel 10, conveniently made of a glass tube clamped by bolts 11 between upper and lower heads 12 and 13, is mounted on the dash 14 of the automobile, and is connected by two pipes to the engine crank-case 17 at the low safe level 18 and at a lower level 19 respectively. These two pipes conveniently open into the vessel 10 through the lower head 13. One of the pipes 15 and 16, it being immaterial which one though the pipe 15 is shown as the one, is also preferably connected to the crank-case 17 at a level 20 which is higher than the low safe level 18 and is at the level to which oil should rise when filling the crank-case; in this branch connection there is a stop-cock 21, which is normally closed. This branch connection at the level 20 is not necessary to the main invention, and is not used save when adding oil. The top of the vessel 10 is connected by a pipe 22 to the intake manifold 23 of the engine, so that when the engine is operated a partial vacuum is created within the vessel 10; the pipe 22 conveniently communicates with the vessel 10 through the upper head 12. Within the vessel 10 is a float 24, which controls the supply of oil to the vessel 10 as by controlling a vent 25 to the atmosphere, conveniently through the lower head 13; when the float 24 rises it opens its atmospheric vent 25, and closes it when it falls.

When the engine is operated, the stop-cock 21 being closed, the engine suction creates a partial vacuum within the vessel 10, and this partial vacuum causes oil to rise from the crank-case 17 through the pipes 15 and 16 into the vessel 10; this is under the assumption that the oil in the crank-case is above the level 18. The rise of oil into the vessel 10 continues until the rising oil lifts the float 24, and so opens the atmospheric vent 25 to let in air from the atmosphere to relieve the partial vacuum and stop the further rise of the oil. The operator sees this oil in the vessel 10 before him. It is found in practice that oil does not leak out through the atmospheric vent 25, even if such vent is so low that the upper end thereof is covered by oil, because the incoming air prevents the outflow of oil through such vent.

The oil remains in the vessel 10 as long as the engine is operating and the oil in the crank-case is above the level 18, which is the low safe level. If the oil in the crank-case drops below such level 18, the lower end of the pipe 15 is uncovered, and air instead of oil is drawn in through such pipe. This supply of air to the vessel 10 eliminates the vacuum therein, and allows the oil in such vessel to flow back to the crank-case 17 by way of the pipe 16. This emptying of the vessel 10 thus indicates the fall of the oil in the crank-case below the low safe level. Thus the presence or absence of oil in the vessel 10 when the engine is operating, tells whether the oil in the crank case is above or below such low safe level.

The two pipes 15 and 16 are provided instead of a single pipe, though a single pipe could be used under some circumstances and is included in the broader aspect of my invention, because it is found that with a single pipe of small size the vessel 10 does not empty itself promptly when the lower end of such single pipe is uncovered, because air and oil do not pass each other readily in such single pipe. This objection to a single pipe does not apply if the pipe is of sufficient diameter; but it is more convenient to use two pipes as shown.

In order to tell when the desired level is reached in filling the crank case with oil, the engine is operated during such filling and the stop-cock 21 is opened. The vessel 10 remains empty during such filling until the level 20 is reached, because until then air is supplied through the pipe 15; but when the oil reaches the level 20 this supply of air is cut off, and oil is drawn up through the pipes 15 and 16 into the vessel 10. Thus when oil appears in the vessel 10 the oil in the crank-case has reached the level 20.

I claim as my invention:

1. An oil-level indicator for internal combustion engines, comprising a vessel connected to the intake of the engine and to the oil-holding part of the engine, and means controlled by the supply of oil to such vessel for limiting such supply.

2. An oil-level indicator for internal combustion engines, comprising a vessel connected to the intake of the engine and to the oil-holding part of the engine, said vessel having an atmospheric vent, and a float-operated valve controlling such vent and controlled by the oil level in such vessel.

3. An oil-level indicator for internal combustion engines, comprising a vessel connected to the intake of the engine and also connected to the oil-holding part of said engine at two levels of the latter, a stop-cock controlling the connection at the higher level to said oil-holding part of the engine, and means controlled by the supply of oil to such vessel for limiting such supply.

4. An oil-level indicator for internal combustion engines, comprising a vessel connected to the intake of the engine and also connected to the oil-holding part of said engine at two levels of the latter, a stop-cock controlling the connection at the higher level to said oil-holding part of the engine, said vessel having an atmospheric vent, and a float-operated valve controlling such vent and controlled by the oil level in such vessel.

5. An oil-level indicator for internal combustion engines, comprising a vessel connected to the intake of the engine, and also connected to the oil-holding part of said engine by two pipes, and means controlled by the supply of oil to such vessel for limiting such supply.

6. An oil-level indicator for internal combustion engines, comprising a vessel connected to the intake of the engine and also connected to the oil-holding part of said engine by two pipes, said vessel having an atmospheric vent, and a float-operated valve controlling such vent and controlled by the oil level in such vessel.

7. A liquid-level indicator for liquid-holding containers associated with internal combustion engines, comprising a vessel located above said container and connected to the intake of said internal combustion engine and to said container, the connection to said container being at a point above the bottom thereof, said vessel including means whereby the presence or absence of liquid therein may be apparent, and means controlled by the supply of liquid to such vessel for limiting such supply.

8. A liquid-level indicator for liquid-holding containers associated with internal combustion engines, comprising a vessel located above said container and connected to the intake of said internal combustion engine and to said container, the connection to said container being at a point above the bottom thereof, said vessel including means whereby the presence or absence of liquid therein may be apparent and having an atmospheric vent, and a float-operated valve controlling such vent and controlled by the liquid level in such vessel.

9. A liquid-level indicator for liquid-holding containers associated with internal combustion engines, comprising a vessel located above said container and connected to the intake of said internal combustion engine and to said container, the connection to said container being by way of two separate pipes, said vessel including means whereby the absence or presence of liquid therein may be apparent, and means controlled by the supply of liquid to said vessel for limiting such supply.

10. A liquid-level indicator for liquid-holding containers associated with internal combustion engines, comprising a vessel located above said container and connected to the intake of said internal combustion engine and to said container, the connection to said container being by way of two separate pipes, said vessel including means whereby the absence or presence of liquid therein may be apparent and having an atmospheric vent, and a float-operated valve controlling such vent and controlled by the liquid level in such vessel.

11. A liquid-level indicator for liquid-holding containers associated with internal combustion engines, comprising a vessel located above said container and connected to the intake of said internal combustion engine and to said container, the connection from said vessel to said container communicating with the container at two different levels, a stop-cock controlling the connection to said container at the higher level, said vessel including means whereby the absence or presence of liquid therein may be apparent, and means controlled by the supply of liquid to said vessel for limiting such supply.

12. A liquid-level indicator for liquid-holding containers associated with internal combustion engines, comprising a vessel located above said container and connected to the intake of said internal combustion engine and to said container, the connection from said vessel to said container communicating with the container at two different levels, a stop-cock controlling the connection to said container at the higher level, said vessel including means whereby the absence or presence of liquid therein may be apparent and having an atmospheric vent, and a float-operated valve controlling such vent and controlled by the liquid level in such vessel.

13. An oil-level indicator for internal combustion engines, comprising a conduit opening into the intake manifold of the engine and into the crank case at a desired oil level, said conduit having means associated therewith for preventing oil from being discharged into the intake manifold, and said conduit also having associated therewith means for indicating whether the crank-case end of the conduit communicates with oil or air.

14. A liquid-level indicator for liquid-holding containers associated with internal combustion engines, comprising a conduit opening into the intake manifold of the engine and into the liquid-holding container at a desired level concerning which it is desired to indicate the presence or absence of liquid, said conduit having means associated therewith for preventing liquid from being discharged into the intake manifold, and said conduit also having associated therewith means for indicating whether the liquid-container end of the conduit communicates with liquid or with air.

15. An oil-level indicator for internal combustion engines of automobile, comprising a conduit opening into the intake manifold of the engine and into the crank case at a desired oil level, said conduit having means associated therewith for preventing oil from being discharged into the intake manifold, and means associated with said conduit and mounted on the dash of the automobile for indicating whether air or oil is drawn in at the crank-case end of the conduit.

16. A liquid-level indicator for liquid-holding containers associated with internal combustion engines, of automobiles, comprising a conduit opening into the intake manifold of the engine and into the liquid-holding container at a desired level concerning which it is desired to indicate the presence or absence of liquid, said conduit having means associated therewith for preventing liquid from being discharged into the intake manifold, and means associated with said conduit and mounted on the dash of the automobile for indicating whether air or liquid is drawn in at the liquid-container end of the conduit.

17. In an internal combustion engine, a crank-case for containing lubricant, and means operated by suction from the engine for indicating whether the lubricant in said crank-case is above or below a predetermined level.

18. In an automobile, an internal combustion engine, a liquid-holding container, and means having an indicating element on the dash of the automobile and operated by suction from the engine for indicating whether the liquid in said container is above or below a predetermined level.

In witness whereof, I have hereunto set my hand at Indianapolis, Indiana, this 9th day of May, A. D. one thousand nine hundred and nineteen.

JAMES RYAN.